US008835780B2

(12) United States Patent
Salagean

(10) Patent No.: US 8,835,780 B2
(45) Date of Patent: Sep. 16, 2014

(54) POWER SEAT SWITCH TO PRESENT SIMULTANEOUS ACTIVATION

(71) Applicant: Omron Dualtec Automotive Electronics Inc., Oakville (CA)

(72) Inventor: Alexandru Salagean, Mississauga (CA)

(73) Assignee: OMRON Dualtec Automotive Electronics Inc., Oakville (CA)

( * ) Notice: Subject to any disclaimer, the term of this patent is extended or adjusted under 35 U.S.C. 154(b) by 0 days.

(21) Appl. No.: 13/760,499

(22) Filed: Feb. 6, 2013

(65) Prior Publication Data

US 2014/0021023 A1    Jan. 23, 2014

Related U.S. Application Data

(63) Continuation of application No. 13/546,838, filed on Jul. 11, 2012, now abandoned, which is a continuation of application No. 12/691,410, filed on Jan. 21, 2010, now abandoned.

(60) Provisional application No. 61/146,130, filed on Jan. 21, 2009.

(51) Int. Cl.
*H01H 5/10* (2006.01)
*H01H 9/26* (2006.01)
*B60N 2/02* (2006.01)
*H01H 25/00* (2006.01)
*H01H 25/06* (2006.01)

(52) U.S. Cl.
CPC ......... *H01H 25/06* (2013.01); *H01H 2300/008* (2013.01); *H01H 9/26* (2013.01); *B60N 2/0228* (2013.01); *H01H 25/008* (2013.01)
USPC ......................................................... 200/5 A

(58) Field of Classification Search
USPC ....... 200/4, 5 A, 5 R, 5 B, 6 A, 6 R, 17 R, 18, 200/329, 50.32, 50.33, 50.35
See application file for complete search history.

(56) References Cited

U.S. PATENT DOCUMENTS 3,560,674 A    2/1971 Lewis
4,297,541 A    10/1981 Niinuma
(Continued)

FOREIGN PATENT DOCUMENTS

CN    201017823 Y    2/2006
DE    4235984 A1    4/1994

OTHER PUBLICATIONS

Winnik, Arthur, International Search Report from corresponding PCT Application No. PCT/CA2010/000070; search completed on May 28, 2010.

(Continued)

*Primary Examiner* — Briggitte R Hammond
(74) *Attorney, Agent, or Firm* — John R. S. Orange; Blake, Cassels & Graydon LLP

(57) ABSTRACT

A switch actuating assembly for an automobile seat has a switch operating member moveable along a first path to operate a first switch associated with a first function and moveable along a second path to operate a second switch associated with a second function. To inhibit operation of both functions simultaneously a guide controls movement of the switch operating member. Guide members act between the switch operating member and the guide so that movement of the switch operating member along one of the paths upon movement of the switch operating member along the other of the paths from a rest position. An interlock is provided between the switch operating members of a pair of switch assemblies so that only one function of one of the switch assemblies can be operated at a time.

10 Claims, 10 Drawing Sheets

(56) References Cited

U.S. PATENT DOCUMENTS

| | | |
|---|---|---|
| 4,695,682 A | 9/1987 | Winogrocki |
| 4,743,723 A | 5/1988 | Seabeck |
| 5,021,614 A | 6/1991 | Sasaki et al. |
| 5,233,140 A | 8/1993 | Asano et al. |
| 5,243,156 A | 9/1993 | Shirasaka |
| 5,384,440 A | 1/1995 | Wnuk et al. |
| 5,442,149 A | 8/1995 | Sato |
| 5,668,357 A | 9/1997 | Takiguchi et al. |
| 5,844,182 A | 12/1998 | Hirano et al. |
| 5,866,862 A | 2/1999 | Riffil et al. |
| 5,920,042 A | 7/1999 | Gotoh |
| 5,994,652 A | 11/1999 | Umemura |
| 6,262,379 B1 | 7/2001 | Tajima |
| 6,274,826 B1 | 8/2001 | Serizawa et al. |
| 6,515,241 B2 | 2/2003 | Saiki |
| 6,525,278 B2 | 2/2003 | Villain et al. |
| 6,597,345 B2 | 7/2003 | Hirshberg |
| 6,759,606 B2 | 7/2004 | Fortuny Riera |
| 6,765,165 B1 | 7/2004 | Torrens |
| 6,867,380 B2 | 3/2005 | Miki et al. |
| 6,906,269 B2 | 6/2005 | Nishimura et al. |
| 7,269,439 B2 | 9/2007 | Honda |
| 7,439,460 B1 | 10/2008 | Watson |
| 7,604,080 B2 | 10/2009 | Breed |
| 2003/0150700 A1 | 8/2003 | Fortuny Riera |
| 2005/0045463 A1 | 3/2005 | Schmidt et al. |

OTHER PUBLICATIONS

Luo, Shuyuan; Search Report from corresponding CN Application No. 201080005189.3; search completed May 5, 2014.

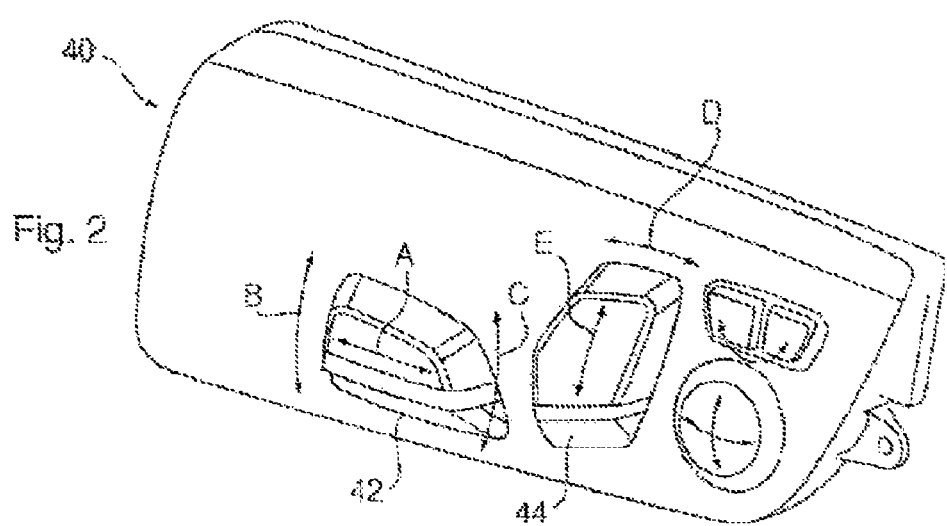
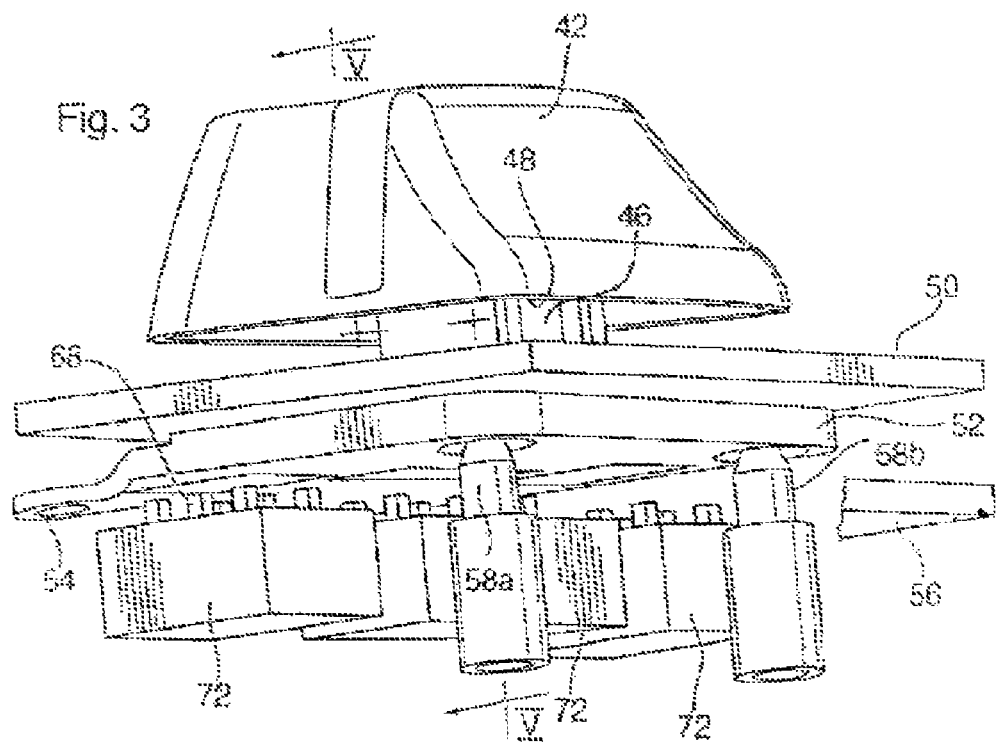

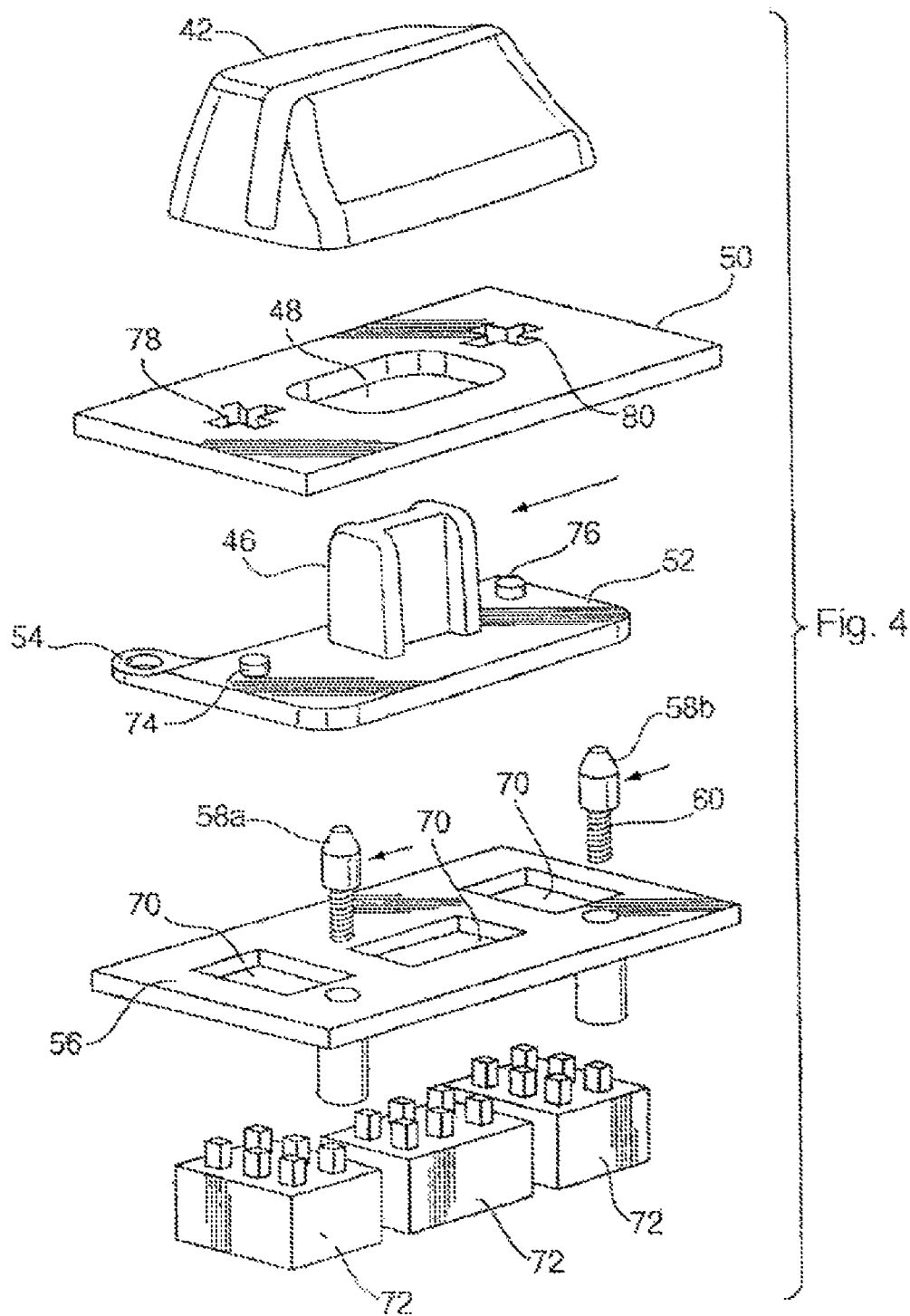

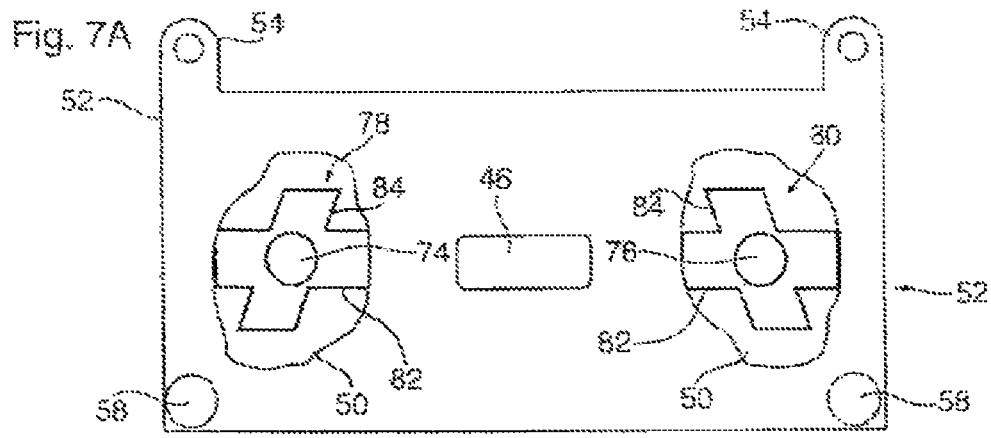
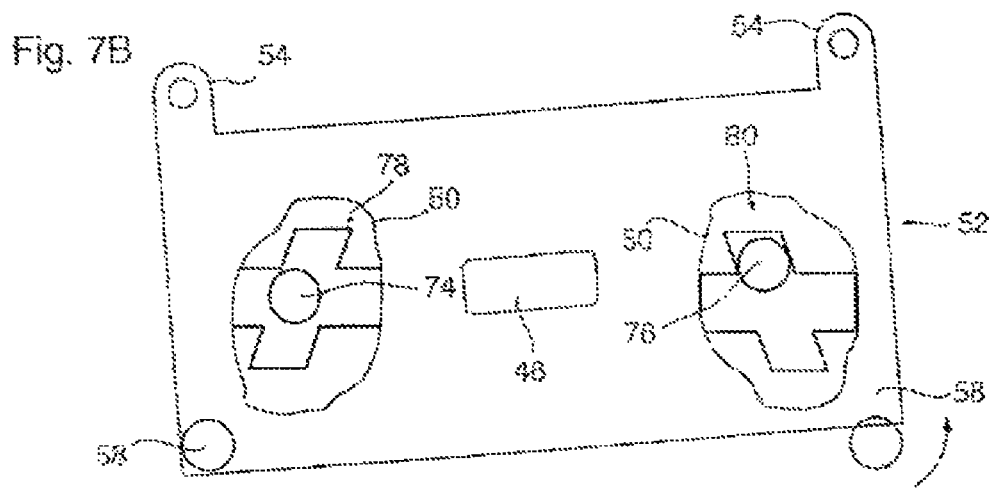
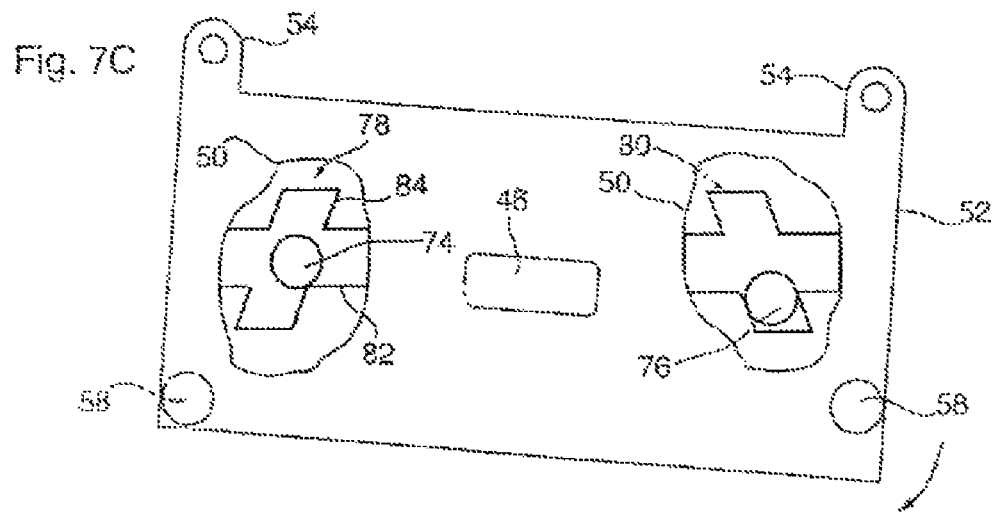

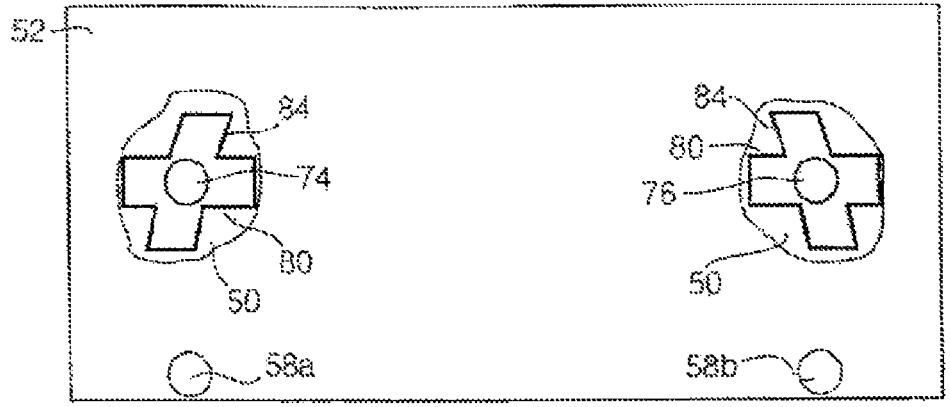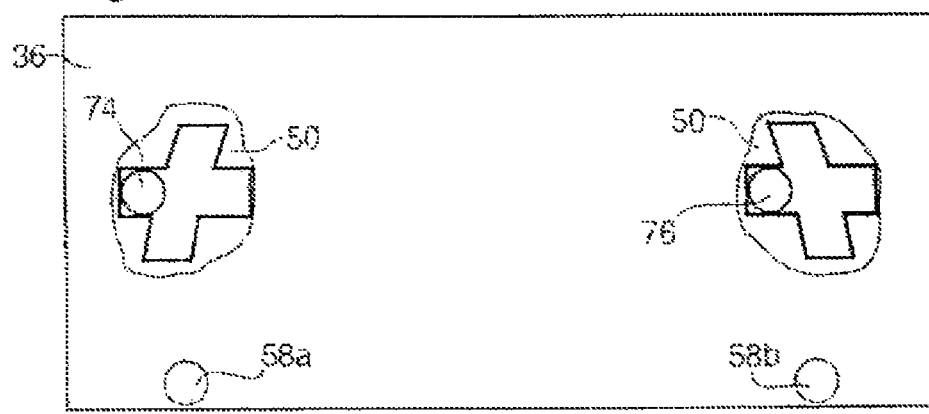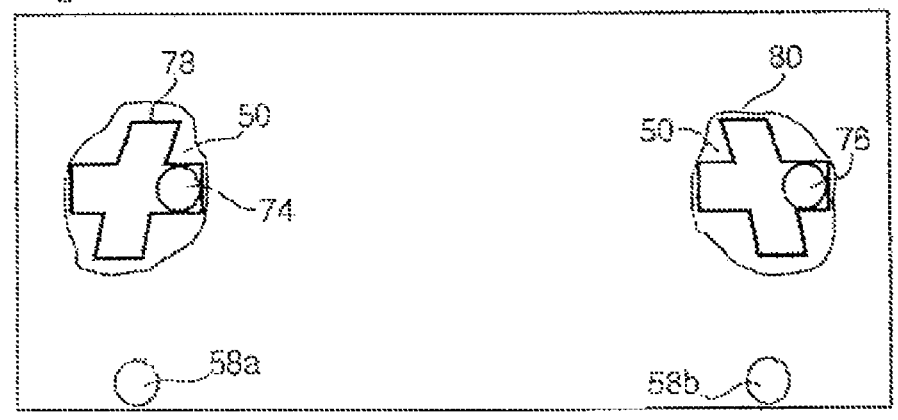

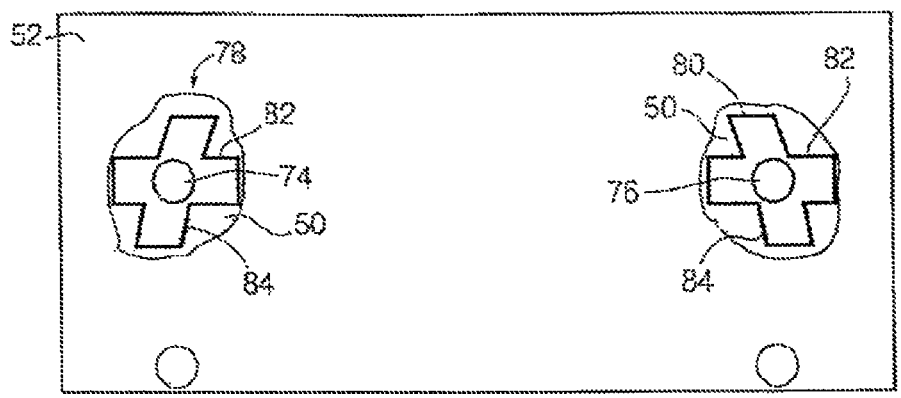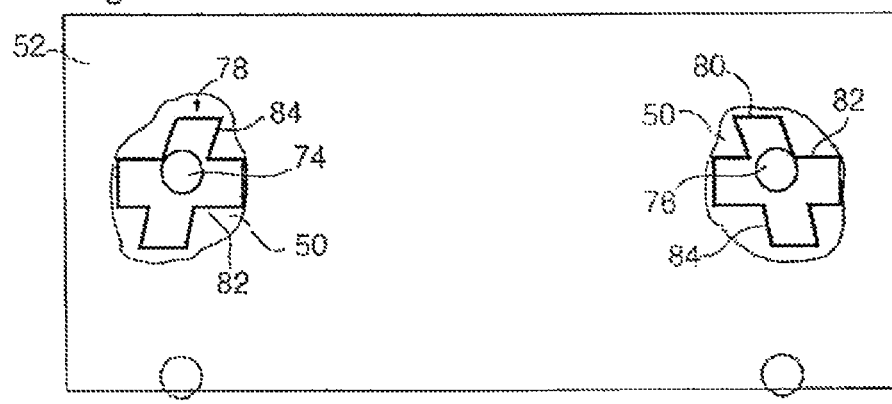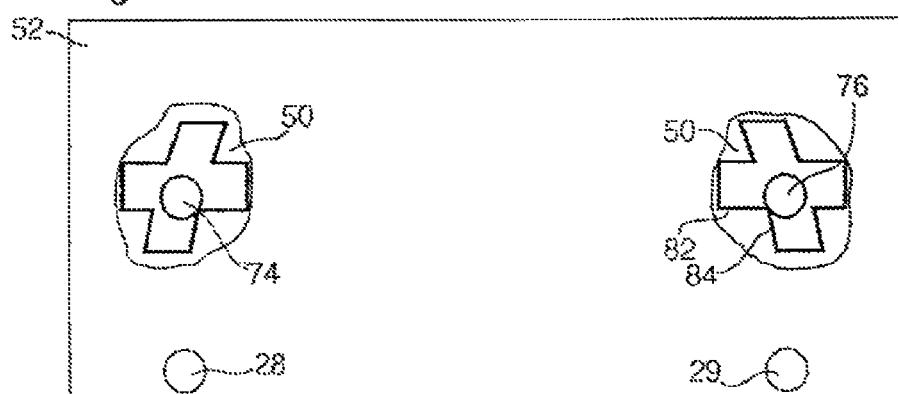

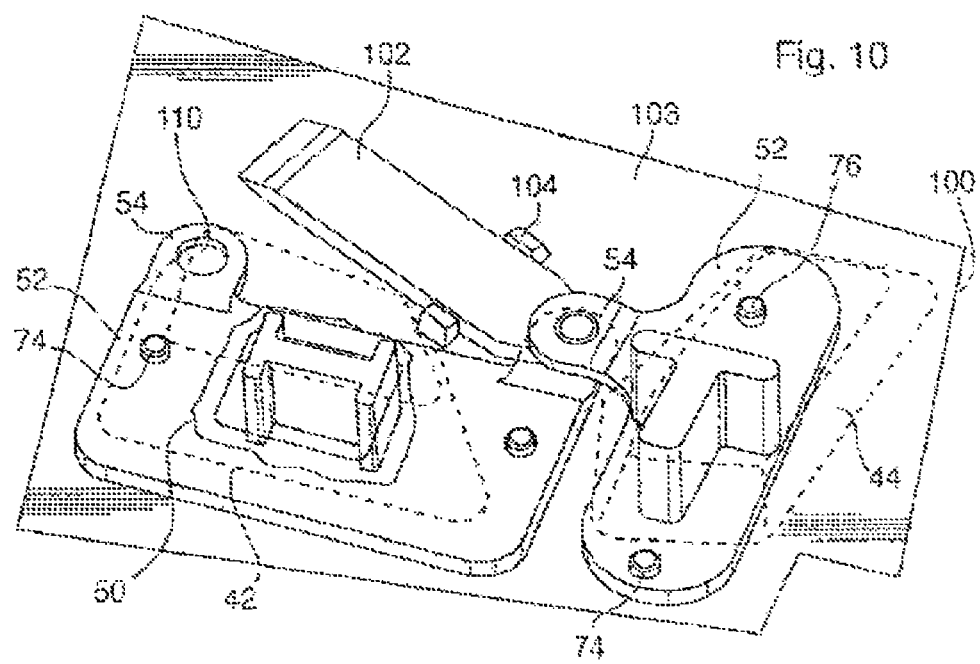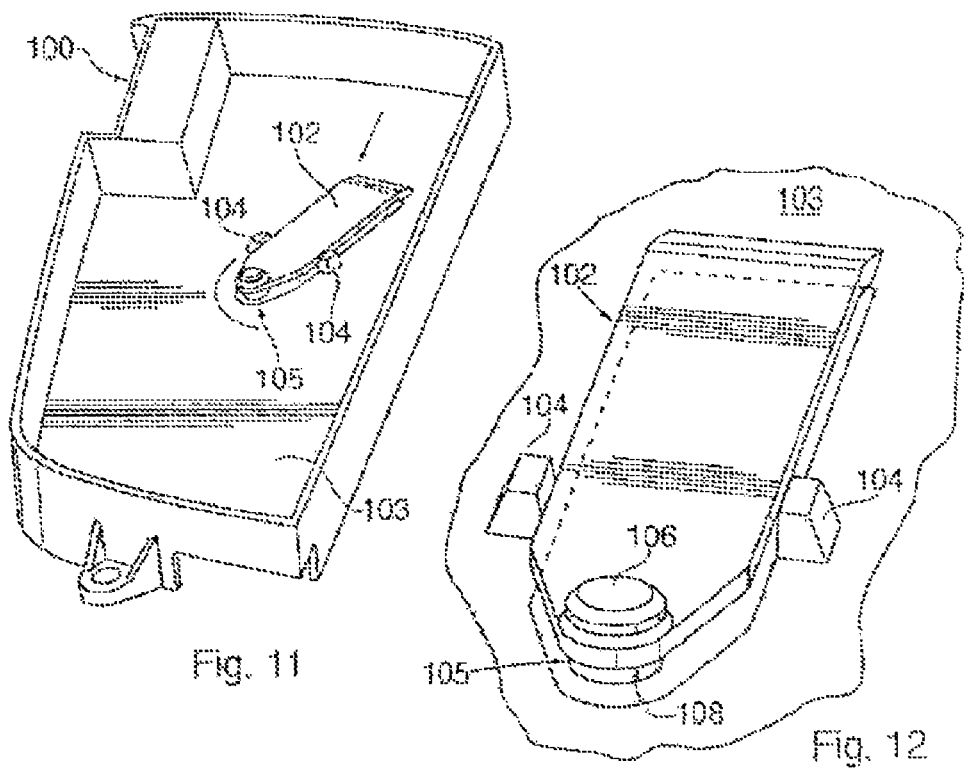

POWER SEAT SWITCH TO PRESENT SIMULTANEOUS ACTIVATION

CROSS REFERENCE TO RELATED APPLICATIONS

This application is a continuation of U.S. patent application Ser. No. 13/546,838 filed on Jul. 11, 2012, which is a continuation of U.S. patent application Ser. No. 12/691,410 filed on Jan. 21, 2010, which claims priority from U.S. Application No. 61/146,130 filed on Jan. 21, 2009, which are incorporated herein by reference.

FIELD OF THE INVENTION

The present invention relates to electrical switches and more particularly to mechanisms for operating and controlling such switches.

DESCRIPTION OF THE PRIOR ART

Electrical switches are used to control the flow of electrical power to and from electrical devices such as motors. Closing of the switch will allow power to flow and upon a attainment to a desired condition, the switch may be opened to Interrupt the flow of power. It is typical to combine multiple switches in to a switch assembly and to utilize the switch assembly to control one or more functions. For example, a switch control member may operate in one direction to supply power to one device and may be moved in another direction to supply power to a different device.

A typical application of electrical switch assemblies used to control multiple functions is an automobile seat. Electric motors are utilized to control the fore and aft position of a seat, the height of the seat its inclination. and the inclination of the back rest relative to the seat cushion. Each of these functions is accomplished by an electric motor controlled by one or more electrical switches.

For ergonomic considerations, it is appropriate to arrange the switches and their control members in a cluster so that the functionality of each switch can be readily understood. Again, referring to the automobile seat by way of example, the switches controlling the fore and aft movement of the seat may be integrated into a switch assembly with the switch controlling the height of the seat. The switch assembly adjusting the inclination of the backrest is positioned adjacent to the seat cushion switch assembly and may be oriented so that the overall cluster of switch control members represents the seat itself.

When integrating multiple functions in to a single switch assembly, independent operation of the switches is retained so that, for example, the position of the seat may be adjusted independently of the height and independently of the backrest. A switch is used to control each of the motors and the operation of those switches is integrated in to a switch actuating assembly that allows for the independent operation of the switches. Such an arrangement facilitates adjustment of the seat.

Operation of each motor will cause the motor to draw a certain current depending upon the load imposed on the motor. The current draw is a maximum when the motor is stalled, as for example, when the end of available travel is reached. Thus in designing the power supply for the switches it is necessary to accommodate the possibility of each of the motors being stalled and each drawing the maximum rated current. As such, the wiring harness supplying power to the seat must be designed to accommodate high current and as a result is a relatively heavy gage. Similarly, the components of the individual switches must be manufactured to tolerate high currents. This leads to additional expense and increase weight in the design of the electrical power supply.

This is further exacerbated when multiple switch assemblies are integrated in to a cluster and each of the switch assemblies controls a plurality of functions.

It is therefore an object of the present invention to obviate or mitigate the above disadvantages.

In general terms, the present invention provides a switch actuating assembly that includes an operating member operable upon each of a plurality of switches. A guide controls movement of the switch operating member and cooperates with the switch operating member to ensure that only one switch is actuated at a time.

According therefore to one aspect of the present invention there is provided a switch actuating assembly having a Switch operating member moveable along a first path to operate a first switch associated with a first function and moveable along a second path to operate a second switch associated with a second function. A guide controls movement of the switch operating member and includes guide members acting between the switch operating member and the guide to constrain the switch operating member for movement along the paths. The switch operating member has a rest position in which the guide members permit movement along either of the paths. The guide members are configured to inhibit movement of the switch operating member along one of the paths upon movement of the switch operating member along the other of the paths from the rest position.

According to a further aspect of the present Invention there Is provided a switch assembly including a pair of switch actuating assemblies. Each of the switch actuating assemblies is operable to control operation of a respective switch to control respective functions. The switch actuating assemblies each include a switch operating member that is moveable from a rest position to operate a switch. The switch operating members overlie one another and have an Interlock member selectively engageable with each of the switch operating members. Movement of either of the switch operating members from the rest position causes the interlock member to engage the other switch operating members and inhibit movement thereof from the rest position.

BRIEF DESCRIPTION OF THE DRAWINGS

An embodiment of the invention will now be described by way of example only with reference to the accompanying drawings in which:

FIG. 2 is a perspective view of a switch cluster for the seat shown in FIG. 1.

FIG. 3 is a perspective view of one of the switch assemblies used In the cluster shown in FIG. 2.

FIG. 4 is an exploded perspective view of the switch assembly shown in FIG. 3.

FIG. 7(a) to 7(c) is a series of diagrams showing relative disposition of components of the switch assembly shown in FIG. 3 during one operation.

FIG. 8(a) to 8(c) is a series of diagrams showing relative disposition of components of the switch assembly shown in FIG. 3 during another operation.

FIG. 9(a) to 9(c) is a series of diagrams showing relative disposition of components of the switch assembly shown In FIG. 3 during yet another operation, FIG. 10 is an elevation of the switch assemblies of FIG. 3 incorporated into a cluster as shown in FIG. 1.

FIG. 11 is perspective view of the housing for the cluster shown in FIG. 10,

FIG. 12 is an enlarged perspective view of the flexible arm shown in FIG. 11.

DETAILED DESCRIPTION OF THE INVENTION

Figure 1:
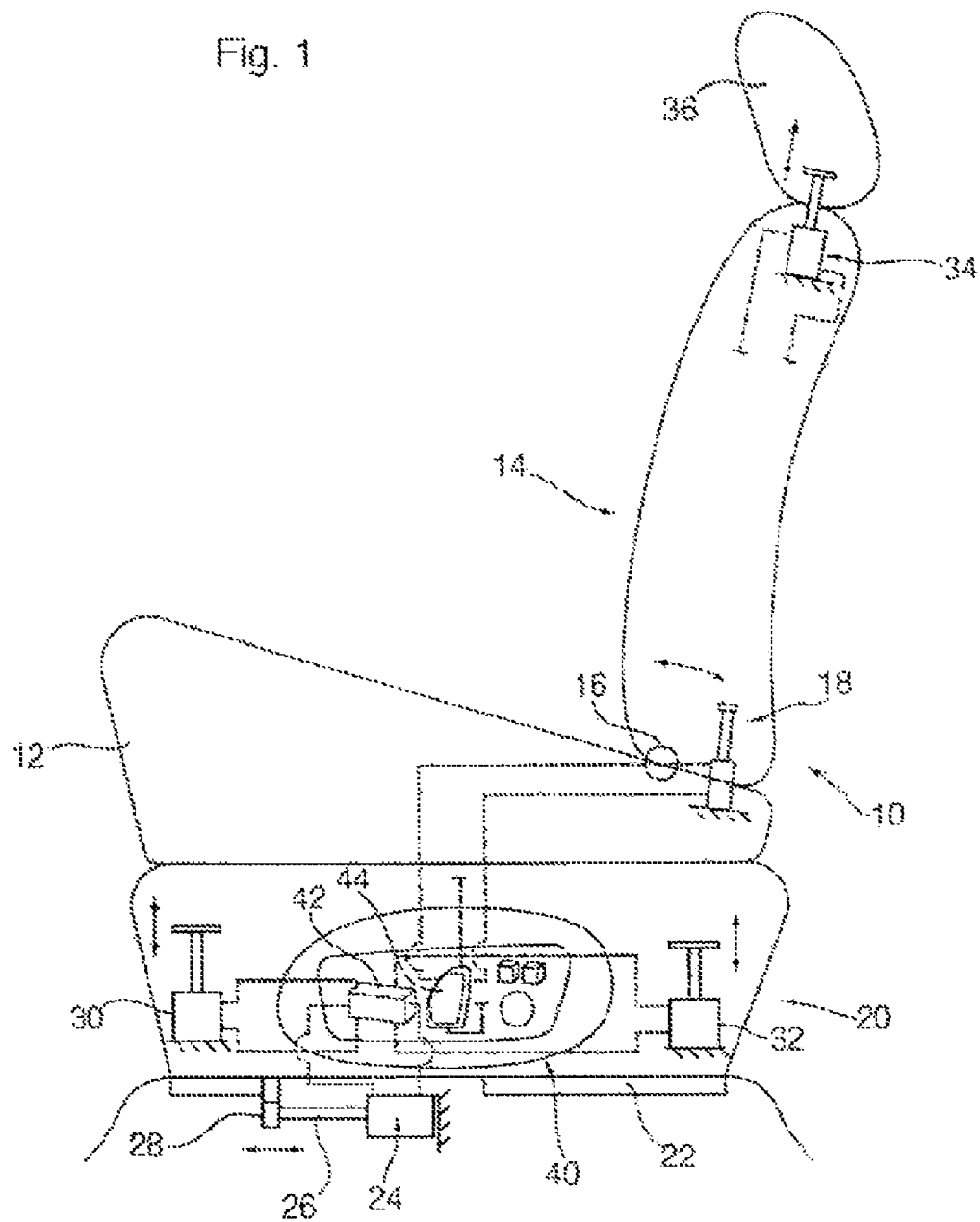
FIG. 1 Is a pictorial illustration of a vehicle seat incorporating motors to adjust the configuration of the vehicle seat.
Figure 5:
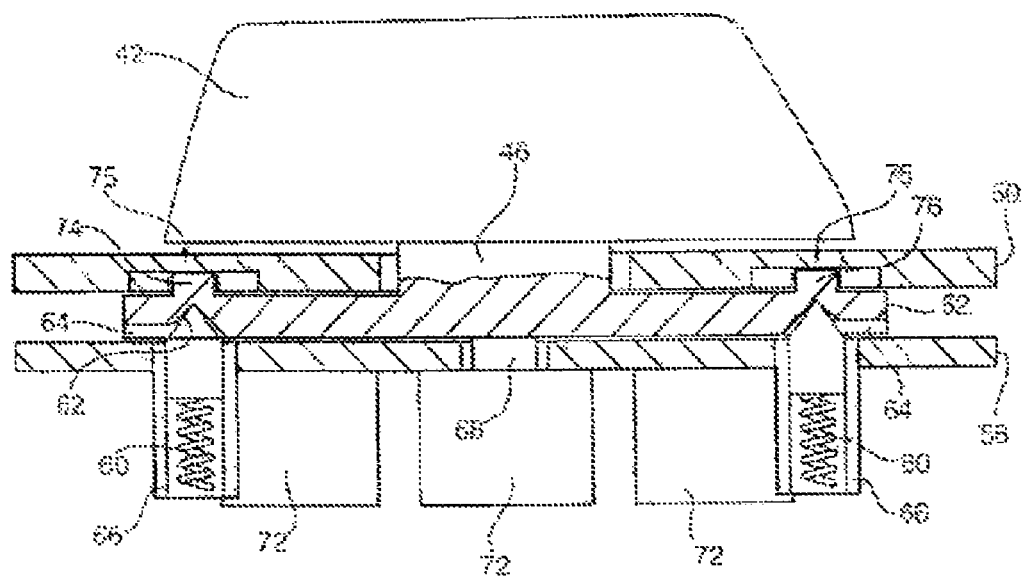
FIG. 5 is a section on the line V-V of FIG. 3.
Figure 6:
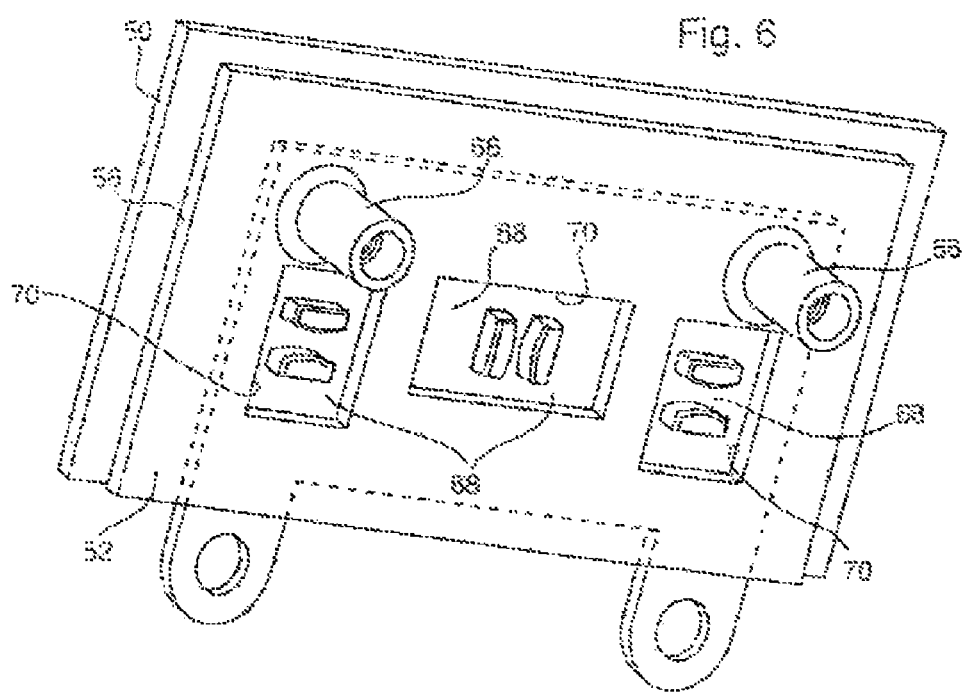
FIG. 6 Is a perspective view, from below, of the switch assembly shown in FIG. 3.
Figure 13:
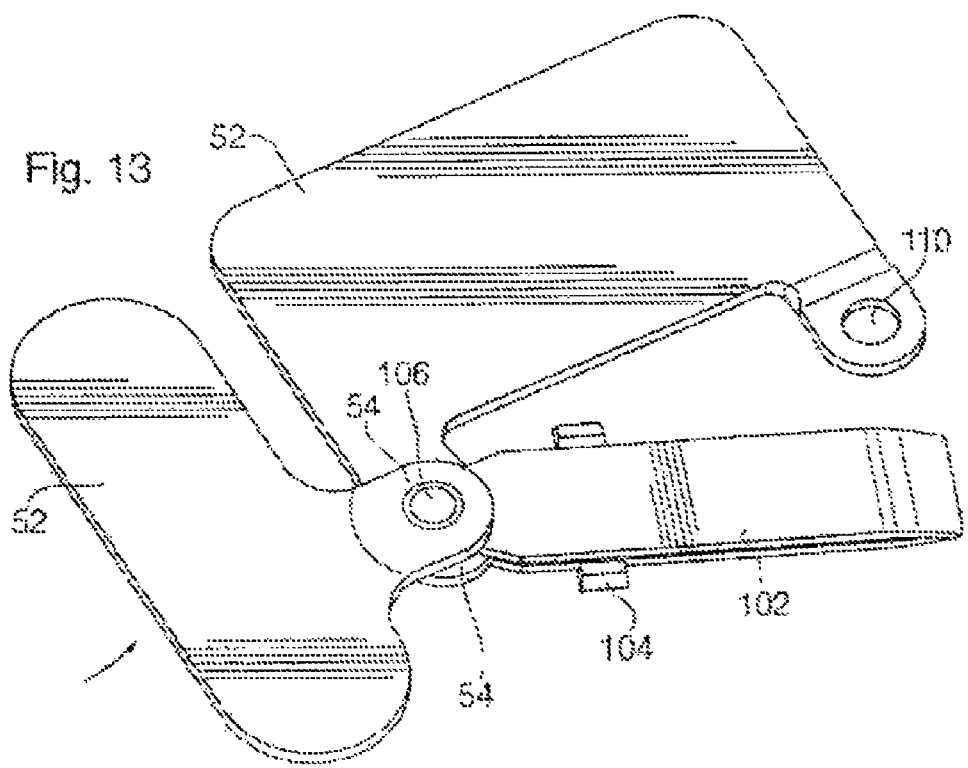
FIG. 13 is an enlarged perspective view of selected portions of the cluster shown in FIG. 10.
Figure 14:
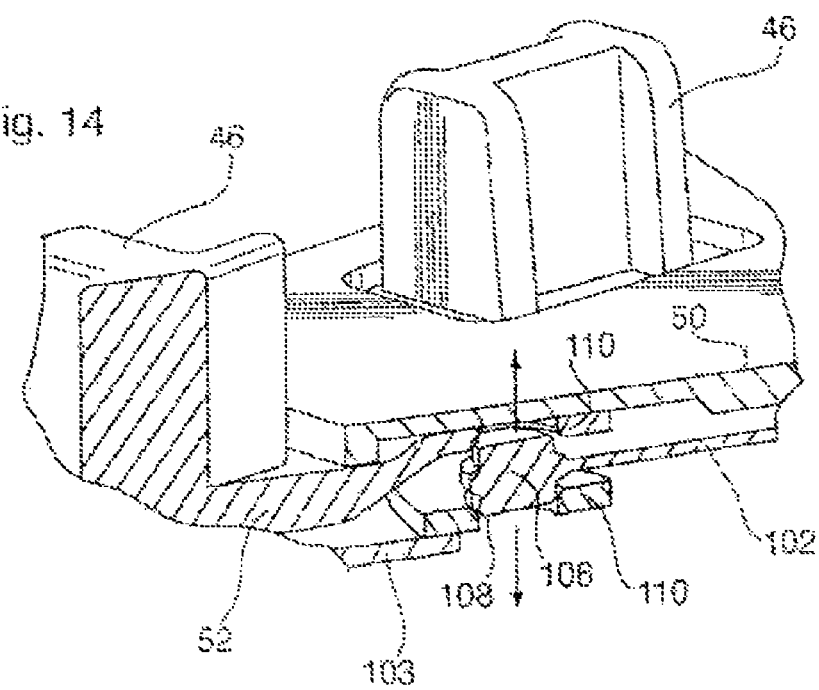
FIG. 14 is a partial sectional view on the line XIV-XIV of FIG. 3.

Referring therefore to FIGS. 1 and 2, by way of example, an automotive seat generally indicated 10 includes a seat cushion 12 and a seatback 14. The cushion 12 and back 14 are pivoted to one another as indicated schematically at 16 and the relative disposition between the cushion 12 and back 14 is controlled by an electric motor 18. The cushion 12 is mounted upon a base 20 that is, in turn, mounted upon rails 22 to permit fore and aft adjustment. Fore and aft adjustment is obtained through the use of an electric motor 24.

The seat base 20 may also be elevated and lowered relative to the rails 22 through motors 30, 32. The motors 30, 32 are independently operable so that the inclination of the seat base may be adjusted as well as its height relative to the rails 22. A motor 34 is similarly provided to adjust the disposition of a headrest relative to the seat back 14.

Each of the motors 18, 24, 30, 32, and 34 is similar and includes a mechanism to convert the rotary motion of the motor to a linear displacement. As illustrated in FIG. 1, the motor 24 rotates a lead screw 26 and cooperates with a nut mechanism 28 to move the seat base 20 along the rail 22. The overall configuration of the adjustable seat is well known in the automotive industry and is provided by way of an example only. Further details of the seat and its construction need not be provided for full understanding of the operation of the present embodiment.

The motors 18, 24, 30, 32, 34 are controlled by a cluster 40 of switch assemblies to be described In further detail below. Each switch assembly has a control member 42, 44 respectively, that operates through a switch operating member to operate switches that control the flow of power to the motors 18, 24, 30, 32, 34. The control member 42 is displaceable in a fore and aft direction, as indicated by the arrow A, to operate switches controlling the motor 24 and cause the seat base 20 to move either forwards or rearwards depending upon the direction of movement of the control member 42. The control member 42 also operates upon switches controlling the motors 30 and 32 so that movement of the forward end of the control member 42, indicated by arrow B, causes motor 30 to either elevate of lower the leading edge of the seat cushion 12. Similarly, movement of the rear end of the control member 42, arrow C, causes a corresponding movement of the motor 32 to elevate the rear of the cushion 12. The control member 42 therefore controls three motors whose combined operation can adjust the position of the seat cushion 12.

The control member 44 similarly controls the motor 18 such that rotation of the control member 44 clockwise, indicated by arrow D, causes the angle between the cushion 12 and seat back 14 to increase. Counter clockwise rotation similarly causes a decrease in the angle. Movement of the control member 44 vertically. Indicated by arrow E, operates switches that control the motor 34 and either elevates or retracts the headrest 36 depending upon the direction of movement. The control member 44 controls two motors 18, 34 whose operation may be combined to provide the optimum configuration for the seat back 14 and headrest 36. Additional functions may be incorporated in to the switch assembly such as a bolster adjustment, lumbar support or seat cushion extension, but as such functions are well known in the art they need not be discussed further at this time.

The switch assemblies associated with the control members 42, 44 are similar in construction and therefore only one will be described In detail. As can best be seen in FIGS. 3 through 6, the control member 42 is connected to a tang 46 that projects through a slot 48 in a guide plate 50. The plate 50 is held stationary relative to the seat 10 and the slot 48 is dimensioned to allow sufficient movement of the tang 46 to operate the switches associated with the control member 42. The tang 46 projects upwardly from a switch operating member 52 that has a pair of ears 54 extending from one edge.

The switch operating member 52 is supported above a stationary base plate 56 by a pair of pintels 58a, 58b, that are biased by springs 60 out of the base plate 56 against the underside of the switch operating member 52. As can best be seen in FIG. 5, the pintels 58 engage conical dimples 62 to locate the pintel 56 relative to the switch operating member 52. A recess 64 is formed on the underside of the switch operating member 52 to accommodate movement of the pintel 58 out of the dimple 62 in one direction.

The springs 60 are supported in cups 66 secured to the base plate 56. Movement of the switch operating member 52 relative to the base plate 56 will cause one or both of the pintels to be moved out of the centre of the dimples 62 and compress the spring 60. The force necessary to compress the spring 60 provides a feel to the control member 42 and provides a bias acting to return the control member 42 to a rest position. The recesses 64 are provided so that movement of the control member 42 along the axis of the recesses 64 causes compression of only one of the springs 60 to provide a consistent feel to the movement of the control member 42.

The switch actuating member 52 carries projections 68 on its underside that extend through apertures 70 in the base plate 56 to engage with and to operate switches 72 carried by the base plate 56. It will be understood that the switches 72 control the supply of electrical power to respective ones of the electric motors and that movement of the switch operating member 42 relative to the base plate causes selected switches to be closed by the projections 68 to operate the motor in the desired manner.

Movement of the switch operating member 52 relative to the guide 50 is controlled by guide members 75 disposed between the switch operating member 52 and the guide 50. The guide members 75 include a pair of followers 74, 76 formed as cylindrical nibs on the upper surface of the switch operating member 52 and sets of tracks 78, 80 respectively. The sets of tracks 78, 80 are moulded in to the guide plate 50, or may be moulded as projections from the guide plate 50. As better seen in FIGS. 7(a) to 7(c), each of the sets of tracks 78, 80 include a linear track 82 and an arcuate track 84. The linear track 82 and arcuate track 84 of each set of tracks 78, 80 intersect to form a cruciform that receives respective ones of the followers 74, 76. The follower 74, 76 may move along either of the tracks 82, 84 and is a snug fit within the track to inhibit relative lateral movement between the track and follower. The sets of tracks 78, 80 are arranged on the guide 50 so that the linear tracks 82 are aligned on a common axis that defines one of the paths of movement. The arcuate tracks 84 are each centred on one of the pintels 58, with the track 84 of set 78 centred on the pintel 58b and the track 84 of set 80 centred on the pintel 58a. As such, the tracks 84 converge in a direction away from the pintels 58.

In operation the resilience of the springs 60 maintains the switch operating member 52 in a stable, rest, position relative to the guide member 50. In this position the tang 46 is centred in the slot 48 and each of the switches 72 is open. None of the motors therefore operate. In the rest position, shown in FIG. 7(A), the followers 74, 76 are located at the intersection of the tracks 82, 84 and so are free to move In either direction along the tracks.

Movement of the control member 42 from the rest position will close one of the switches 72, and by virtue of the cooperation of the guide members 75, will inhibit operation of the other switches. If the control member 42 is moved counter clockwise so as to elevate that rear of the seat cushion 12, the movement is transferred to the tang 56 causing the switch operating member 52 to be displaced as shown in FIG. 7b. The switch operating members is supported upon the pintels 58 and rotates counter clockwise about one of the pintels 58a and the pintel 58b is displaced from the dimple 82. The follower 76 moves along the leg 84 of set of tracks 80, causing the projections 68 to operate the switch 72 associated with the motor 32. The track 84 is arcuate centered on the dimple 62 associated with the pintel 58a so that the pin 74 remains substantially in the intersection of the tracks 82, 84 of the set 78.

With the follower 76 located within the leg 84, the flanks of the leg 84 inhibit movement of the followers 74, 76 along the linear legs 82. An attempt therefore to move the control knob 42 to move the seat fore and aft is resisted by the engagement of the follower 76 with the leg 84.

The convergence of the tracks 84 also inhibits the follower 74 from entering the track 84 of set 78. An attempt to rotate the control member 42 to operate the motor 30 causes the follower 74 to abut the tanks if the legs 84 of track 78 and Inhibits relative movement between the guide 50 and the switch operating member 52. Accordingly, rotation of the control member 42 to operate one of the motors 30 or 32 effectively inhibits operation of the other of the motors 24, 30 or 32 so that only a single motor can be operated. Release of the control member 42 returns the switch actuating member to the rest position under the bias of springs 60. A similar action occurs if the control member 42 is rotated clockwise, as shown in FIG. 7c.

As can be seen in FIGS. 8(a) to 8(c), a similar situation occurs when the control member 42 is operated and moves the fore or aft. Movement of the control member 42 is transferred to the switch operating member 52 causing the followers 74, 76 to move in to the linear tracks 82, The pintels 58 are displaced from the dimples 62, with one of them entering the recess 64. Once engaged in the linear tracks, rotation of the knob 42 is prevented and only the single operation of the motor 24 may occur.

If an attempt is made to operate both of the motors 30, 32 simultaneously, as by bodily moving the control member 42 vertically, the convergence of the tracks 84 prevents the followers 74, 70 from moving in to the tracks 84. As can be seen in FIGS. 9(a) to 9(c), the followers 74, 76 engage the flanks of the tracks 84 and inhibit bodily displacement in either direction.

The provision of the convergent tracks 84 therefore ensures that only one of the motors 30, 32 may be operated and that, once operated, the followers 74, 76 may not be displaced linearly to allow operation of the motor 24. Accordingly, only a single motor may operated from the control member 44.

A similar arrangement is provided for the control member 44, although only two motors need to be controlled. In this arrangement, the set of tracks 78 is modified so that only a linear track 74 is provided. The followers 74, 76 may be displaced along each of the linear tracks 82 to effect movement of the motor 34. Rotation of the control member 44 causes follower 76 to engage the track 84 of the set 80 and thereby inhibit further operation of the switches associated with the motor 34.

Similarly, if the control member 42 is only required to operate switches upon rotation, e.g. operate only motors 30, 32 with no linear actuation, the tracks 82 may be omitted. The convergence of the tracks 84 ensures that only one switch may be operated.

The switch cluster 40 utilises a pair of switch assemblies and to avoid simultaneous operation of the control members 42 and 44, an interlock is provided. The interlock acts between the switch operating members 52 associated with the control member 42, 44 so that any one may be moved at a time. Referring to FIGS. 10 through 15(a) to 15(c), the switch assemblies are located within a housing 100. A cantlievered locking arm 102 is moulded within the housing 100 and projects above the base 103 of the housing 100. The arm 102 is located by a pair of cheeks 104 moulded in to the base 103 of the housing 100 so that the arm 102 is constrained to flex in the plane defined by the cheeks 104. A shuttle 105 is formed at the free end of the arm 102 by a pair of cylindrical discs 106, 108 on opposite sides of the arm 102 so as to project in opposite directions.

The switch assemblies are located within the housing 100 as indicated in FIG. 10 and arranged so that an ear 54 of each of the switch operating members 52 overlie. Each of the ears 54 has a cylindrical hole 110 that is dimensioned to receive one of the discs 106, 108. The edges of the holes 110 are chamfered, as indicated at 112, to provide a cam surface that engages the periphery of respective ones of the disks 106, 108. The arm 102 extends between the ears 54 with the shuttle 105 aligned with the holes 110. This can best be seen in FIG. 14 and 15 where it will be noted that the shuttle 105 is of slightly greater height than the spacing between the overlying ears 54. As such, in the rest position of each switch operating member 52, the apertures 110 are aligned and the discs 106, 108 are located within respective ones of the apertures 110 and overlapping the cam surfaces 112.

Operation of one of the control members 40, 42 causes-a corresponding movement of the switch operating member 52 about its respective pivot point oh the pintel 58 and translation of the ear 54. The movement of the switch operating member 52 causes the cam surface 112 to engage the corresponding disc 106, 108 and displace the shuttle 105. The arm 102 is flexed causing the other of the discs 106, 108 to be moved in to the aperture 110 of the other switch operating member 52. This can be seen in FIG. 15(b) where the lower switch operating member 52 associated with the control member 40 is moved, causing the shuttle 105 to be displaced in to the aperture 110 of the upper switch operating member. The lower switch operating member 52 is free to move as the shuttle has been moved out of the aperture 110 through the engagement of the cam surface 112. However, the other operating member 52 is not able to move from the rest position as the disc 106 is in abutment with the hole 110.

Figure 15A:
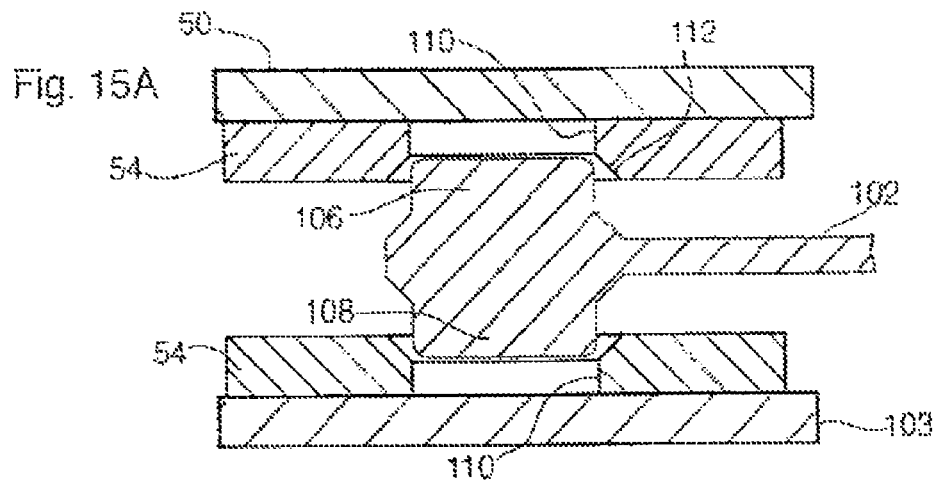
FIG. 15(a) to 15(c) are a series of partial sectional views of the flexible arm shown in FIG. 14 in various positions.
Figure 15B:
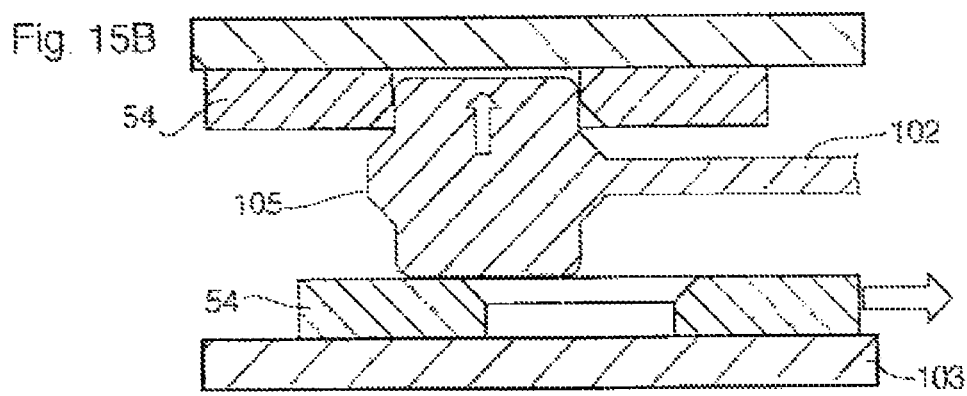
Figure 15C:
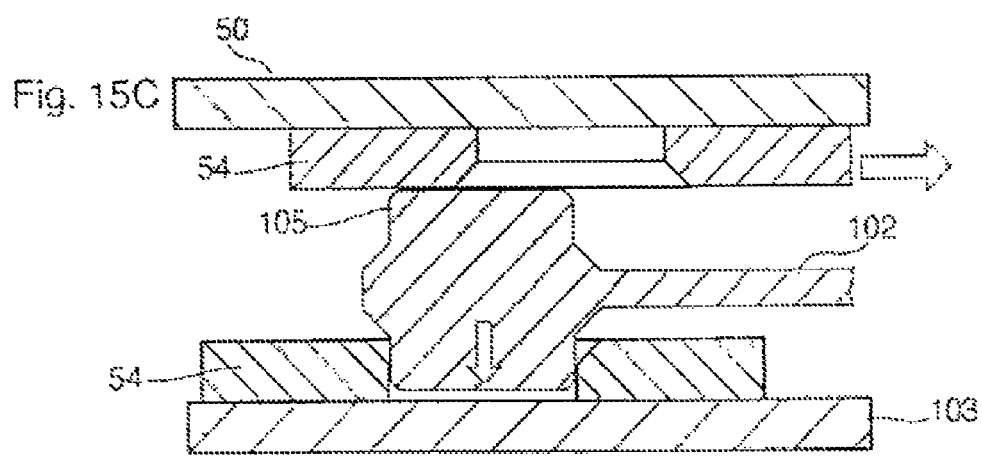

Similarly, as illustrated in FIG. 15(c), movement of the upper operating member 52 will cause the shuttle to be displaced in to the aperture 110 of the lower operating 52 and prevent further movement of that operating member.

Through the use of the interlock between the two switching operating members therefore only one of the switch assemblies may be used at any time. Once the switch operating member has been moved, the other switch operating member is locked to the housing inhibiting any further movement of its control member. The use of the interlock between the two switches does not effect the functioning of the guide members acting between a switch operating member and the guide in each switch assembly so that even with a nesting of two switch assemblies in a cluster only a single motor can be operated at any one time.

What is claimed is:

1. A switch actuating assembly having a switch operating member moveable along a first path to operate a first switch associated with a first function, moveabie along a second path to operate a second switch associated with a second function, and along a third path to operate a switch associated with a third function, a guide to control movement of said switch operating member, guide members acting between said switch operating member and said guide to constrain said switch operating member for movement along said paths, said switch operating member having a rest position in which said guide members permit movement along any of said paths and said guide members being configured such that upon movement of said switch operating member along one of said paths from said rest position, movement of said switch operating member along the other two of said paths from said rest position is inhibited, one of said guide and switch operating member including three tracks, each track defining a respective one of said paths, and the other of said switch operating members and said guide having followers engagable with respective ones of said tracks, a pair of said tracks being spaced from one another and intersecting a third of the tracks at spaced locations, said pair of said tracks being convergent to vary the spacing of said pair of tracks so that movement of one of said followers along one of said pair of tracks from said rest position inhibits movement of another of said followers along the other of said pair of tracks.

2. A switch operating assembly according to claim 1 wherein said switch operating member is supported on a pair of yieldable connections, each of which defines a centre of rotation of said switch operating member relative to said guide, and said tracks are each arcuate and centred on respective ones of said yieldable connections.

3. A switch actuating assembly according to claim 1 wherein said switch operating member is supported on a pair of yieldabie connections to permit movement along said paths.

4. A switch according to claim 3 wherein said switch operating member is rotatable relative to said guide to move said follower along one of said tracks and is translated relative to said guide to move said follower in to the other of said tracks.

5. A switch actuating assembly according to claim 4 wherein each of said yieldable connections provides a centre of rotation of said switch operating member relative to said guide.

6. A switch operating assembly according to claim 5 wherein said one of said tracks is arcuate and centred on one of said yieldable connections.

7. A switch assembly including a pair of switch actuating assemblies, each of said switch actuating assemblies having a switch operating member operable independently of the other to control operation of a respective switch to control respective functions, each of said switch operating members moveable from a rest position to operate a switch, said switch operating members overlying one another and having an interlock member selectively engageable with either of said switch operating members, movement of either of said switch operating member from said rest position causing said interlock member to engage the other of said switch operating members and inhibiting movement thereof from said rest position.

8. A switch assembly according to claim 7 wherein said interlock member is shuttle displaceable by movement of one of said switch operating members to engage the other.

9. A switch assembly according to claim 8 wherein said shuttle is engaged by a cam surface on said switch operating member upon movement from said rest position.

10. A switch assembly according to claim 9 wherein each of said switch operating members has an aperture to receive said shuttle, said apertures being aligned at said rest position.

* * * * *

UNITED STATES PATENT AND TRADEMARK OFFICE
CERTIFICATE OF CORRECTION

| | | |
|---|---|---|
| PATENT NO. | : 8,835,780 B2 | Page 1 of 1 |
| APPLICATION NO. | : 13/760499 | |
| DATED | : September 16, 2014 | |
| INVENTOR(S) | : Alexandru Salagean | |

It is certified that error appears in the above-identified patent and that said Letters Patent is hereby corrected as shown below:

On the Title Page, Item (54) and in the Specification, Column 1, Line 1, in the Title, replace "Present" with -- Prevent --

Signed and Sealed this
Sixteenth Day of December, 2014

Michelle K. Lee
*Deputy Director of the United States Patent and Trademark Office*